United States Patent [19]

Plum

[11] Patent Number: 4,710,556
[45] Date of Patent: Dec. 1, 1987

[54] PROCESS FOR PREPARING COPOLYMERS AND USE OF THE PRODUCTS OBTAINED

[75] Inventor: Helmut Plum, Taunusstein, Fed. Rep. of Germany

[73] Assignee: Hoechst AG, Fed. Rep. of Germany

[21] Appl. No.: 546,577

[22] Filed: Oct. 28, 1983

[30] Foreign Application Priority Data

Jan. 22, 1981 [DE] Fed. Rep. of Germany ....... 3101887

[51] Int. Cl.$^4$ ............................................. C08F 18/14
[52] U.S. Cl. .................................... 526/273; 526/272; 526/324; 526/227
[58] Field of Search .............. 525/378, 379; 526/272, 526/273, 307.7, 317, 320, 324, 323.2; 528/393

[56] References Cited

U.S. PATENT DOCUMENTS

| | | | |
|---|---|---|---|
| 2,361,019 | 10/1944 | Gerhart | 526/324 |
| 3,449,300 | 6/1969 | Slocombe | 526/324 |
| 3,956,245 | 5/1976 | Van Steenis et al. | 526/324 |

Primary Examiner—Joseph L. Schofer
Assistant Examiner—Angela L. Fugo
Attorney, Agent, or Firm—Bierman & Muserlian

[57] ABSTRACT

Process for preparing copolymers from esters of an unsaturated carboxylic acid with at least one other unsaturated monomer, characterized in that the following components are copolymerized in radical substance polymerization:

(A) 5 to 60 parts by weight of at least one diester of an $\alpha,\beta$-olefinically unsaturated dicarboxylic acid having 1 to 8 carbon atoms in the ester group, (B) 10 to 70 parts by weight of at least one vinyl aromatic hydrocarbon having one vinyl group, (C) 0 to 30 parts by weight of at least one glycidyl ester of an aliphatic saturated monocarboxylic acid branched in the $\alpha$-position, (D) 0 to 50 parts by weight of at least one ester, amide and/or anhydride of an $\alpha,\beta$-olefinically unsaturated mono- and/or dicarboxylic acid, (E) 0 to 40 parts by weight of at least one $\alpha,\beta$-olefinically unsaturated monocarboxylic acid, the sum of components (A) to (E) being 100 parts by weight, whilst at least a part of component (A) is at first introduced into the reaction vessel alone or in combination with at least a part of component (C) and a mixture of component (B) with at least one of components (D) and (E) and any remaining parts of components (A) and/or (C) is added in batches at 140° to 200° C. together with a radical initiator, alone or in conjunction with a regulator, and if component (C) is present, at least an equimolar quantity of component (E) is used; and the use of the products thus obtained as binders for the preparation of coating compositions.

13 Claims, No Drawings

PROCESS FOR PREPARING COPOLYMERS AND USE OF THE PRODUCTS OBTAINED

This is a continuation of copending Ser. No. 340,647 filed Jan. 19, 1982, now abandoned.

The invention relates to a process for preparing copolymers by radically initiated substance polymerisation. Radically initiated polymerisation reactions are generally exothermic reactions; they are therefore usually carried out in solution, in emulsion or in suspension. The solvent or diluent makes it easier to control the exothermic reaction and the reduced viscosity makes it possible to remove the heat of polymerisation easily by stirring.

Substance copolymerisation is also known. This kind of polymerisation has a number of advantages: e.g. there are no restrictions on the use of solvents or diluents; and the polymer can be used directly in solvent-free compositions for coatings, without having to be isolated first. However, in practice, substance polymerisation is seldom effected. During substance polymerisation, the viscosity increases appreciably, so that it is no longer possible to stir the product effectively and the heat of polymerisation can no longer be totally removed. The larger the batch, the more difficult it is to control polymerisation and prevent it from going out of control. To overcome these problems, polymerisation is effected, for example, until a moderate conversion is obtained in a first stage, and then polymerisation is completed in suitable apparatus, in a second stage. This process, which is, however, relatively laborious, is described, for example, in a publication relating to the preparation of acrylate resins containing glycidyl groups.

A process for preparing polymers by radically initiated substance polymerisation is also described in another specification. However, the process is restricted to copolymers of acrylic monomers and unsaturated monomers, preferably diesters of fumaric and maleic acid. Preferably acrylic monomers, the homopolymers of which have glass transition temperatures of −40° C. or less, are used. The copolymers described are suitable only as lubricants, wetting agents or flow agents or as plasticisers.

Another publication describes the preparation of an acrylic resin by substance copolymerisation of (1) 0 to 30% of hydroxyalkyl esters of acrylic and/or methacrylic acid, (2) 0 to 60% of styrene or derivatives thereof, (3) 10 to 90% of alkyl esters of acrylic and/or methacrylic acid, (4) 0 to 30% of olefinically unsaturated mono- or dicarboxylic acids, e.g. acrylic or methacrylic acid, or hemiesters of maleic acid, and (5) 10 to 70% of monoallyl ethers of a trihydric alcohol.

The component listed under (5) is an essential component for the copolymerisation, since in this method, in which component (5) is first introduced into the reaction vessel and the other components are added at over 100° C., substance copolymerisation with components 1 to 4 alone is not feasible. As is apparent from the description of this specification, this process does, however, have the disadvantage that unreacted monomer is left behind and this has a deleterious effect in the end product. This residual content may be about 5 to 6% by weight, based on the monomer (5) used.

Moreover, the substance copolymerisation of (A) vinyl or vinylidene chloride or a vinyl monocarboxylate, (B) vinyl aromatic compounds, (C) possibly acrylic or methacrylic acid esters of mono- or polyhydric alcohols and optionally other copolymerisable monomers has also been described.

If a yield of more than 98% is desired, however, this polymerisation can only be carried out within a relatively narrow temperature range (from 150° to 180° C.). As is shown by the examples in this publication, only products with a relatively high molecular weight are obtained by this process. Moreover, component (A) can only be copolymerised under normal pressure if component (C) is present, and indeed if an ester of a monocarboxylic acid with more than 9 carbon atoms is used.

There is therefore a need for a process for substance copolymerisation which yields solvent-free, relatively low molecular products with a low residual monomer content and which may be carried out within a broad temperature range.

The invention therefore provides a process for preparing copolymers of esters of an unsaturated carboxylic acid with at least one other unsaturated monomer, which is characterised in that the following components are copolymerised in a radical substance polymerisation:

(A) 5 to 60, preferably 10 to 30 parts by weight of at least one diester of an $\alpha,\beta$-olefinically unsaturated dicarboxylic acid having 1 to 8 carbon atoms in the ester group, (B) 10 to 70, preferably 35 to 60 parts by weight of at least one vinyl-aromatic hydrocarbon having one vinyl group, (C) 0 to 30, preferably 5 to 15 parts by weight of at least one glycidyl ester of an aliphatic saturated monocarboxylic acid branched in the $\alpha$-position, (D) 0 to 50, preferably 3 to 10 parts by weight of at least one ester, amide and/or anhydride of an $\alpha,\beta$-olefinically unsaturated mono- and/or dicarboxylic acid, (E) 0 to 40 parts by weight of at least one $\alpha,\beta$-olefinically unsaturated monocarboxylic acid, the sum of components (A) to (E) being 100 parts by weight, whilst at least a part of component (A) is first introduced into the reaction vessel alone or in combination with at least a part of component (C) and, a mixture of component (B) with at least one of components (D) and (E) and any remaining parts of components (A) and/or (C) is added in batches at 140° to 200° C. together with a radical initiator, alone or in conjunction with a regulator, and if component (C) is present at least an equimolar quantity of component (E), referred to component (C), is used.

The process according to the invention makes it possible to prepare solvent-free copolymers by a simple method, preferably yielding low molecular weight products with a low residual monomer content.

By putting components (A) and possibly (C) in first, on the one hand an initial dissolving effect is obtained and hence a good and rapid removal of the heat of the reaction, and on the other hand it is also possible to use relatively high polymerisation temperatures far above the melting point of the copolymer formed, so that even towards the end of polymerisation the viscosity is still low enough to permit effective stirring, thus enabling the reaction to be controlled more easily.

One advantage of the process according to the invention is that, as a result of the ease of controlling the process, it may be carried out in any reaction vessel suitable for polymerisation in solution. The heat of polymerisation produced may be controlled without any difficulty. A particular advantage of this method of polymerisation is the improved yield of copolymer, compared with solution, emulsion or suspension polymerisation, in the reaction vessel in question. Another advantage of the reaction according to the invention is that it may be carried out without the use of regulators, which are generally toxic and evil-smelling.

Examples of component (A) include esters of maleic and fumaric acid, preferably with saturated monohydric alcohols with 1 to 8, preferably 1 to 4 carbon atoms in the molecule, such as dimethyl maleinate, diethyl fumarate, dibutyl maleinate and dibutyl fumarate, either individually or in admixture.

Examples of component (B) include styrene, alkyl styrene, for example α-methyl styrene or a vinyl toluene, either individually or in admixture. The alkyl groups generally have 1 to 3 carbon atoms.

Component (C) may be, for example, a glycidyl ester with 12 to 14 carbon atoms of α-monoalkyl- and/or α,α-dialkylalkane monocarboxylic acids, these acids thus having 9 to 11 carbon atoms.

Examples of esters for component (D) include esters of carboxylic acids, but preferably acrylic and methacrylic esters, with mono- or polyhydric alcohols, preferably those with 1 to 18, more particularly 1 to 12 carbon atoms, such as methanol, ethanol, the various butanols, 2-ethylhexanol, lauryl alcohol, stearyl alcohol, the various fatty alcohols, such as soya oil fatty alcohols and the like, cycloalkyl alcohols, such as terpene alcohols, e.g. the various borneols; also esters with polyhydric alcohols with, for example, 2 to 10 carbon atoms, such as ethylene glycol, propylene glycol, butanediol, trimethylolpropane or -ethane, glycerol. Glycidyl esters include, for example, diglycidyl esters of maleic or fumaric acid, preferably glycidyl acrylate and glycidyl methacrylate.

Examples of component (D) also include the reaction products of (a) glycidyl esters of aliphatic saturated monocarboxylic acids, branched in the α-position, and/or glycidyl ethers with (b) α,β-olefinically unsaturated carboxylic acids, such as acrylic and/or methacrylic acid or the like.

Amides include, for example, acrylamide or methacrylamide. Anhydrides include, for example, maleic anhydride, dimethyl maleic anhydride and/or citraconic anhydride.

The substances of component (D) may be used either alone or in admixture. If alkyl esters of monohydric alcohols are present, these may also be used as the sole constituent of component (D), but this is not the preferred embodiment. Generally, these alkyl esters will be used together with compounds having functional groups, e.g. hydroxyalkyl esters or glycidyl compounds. It is also possible to use these alkyl esters simultaneously with component (E), i.e. with functional COOH groups, again yielding copolymers having favourable properties.

Examples of components (E) include acrylic acid, methacrylic acid, crotonic acid, hemiesters of olefinically unsaturated dicarboxylic acids the alcohol component of which generally has from 1 to 18 carbon atoms and corresponds, for example, to the mono- and/or polyhydric alcohols mentioned under component (D), and unsaturated fatty acids with 8 to 22 carbon atoms. Examples include eleostearic acid, licanic acid, linolenic acid, linoleic acid, oleic acid, erucic acid, arachidonic acid, clupanodonic acid and ricinoleic acid.

Any radical-forming compound may be used as the polymerisation initiator in the process according to the invention. Initiators of this kind include, for example, aliphatic azo compounds such as azoisobutyronitrile, peroxides such as diacylperoxides, e.g. dibenzoylperoxide, dialkylperoxides such as di-tert.-butyl peroxide or dialkylhydroperoxides such as tert.-butylhydroperoxide. Di-tert.-butylperoxide is particularly preferred. The quantity used is generally from 0.5 to 2.5, preferably 0.5 to 1.9% by weight, based on the total weight of the starting components.

The initiator may be added gradually with the monomers. Some of the initiator may also be added right at the beginning with component A whilst some more initiator is placed in the reactor with the monomers which are added gradually. After all the monomers have been added, there is not generally any need for any additional initiator to complete the polymerisation. However, in some cases, it is also possible to add an additional amount of 0.1 to 1.0% by weight of initiator at intervals after the addition of monomers has ended, but again, in this case, the quantity of initiator should preferably not exceed 2.5% by weight.

The polymerisation temperature depends on the particular molecular weight desired and is substantially higher than the melting point of the resulting copolymer, preferably between 150° and 190° C., more particularly between 160° and 185° C. Thus, at the polymerisation temperature, the copolymer is liquid and can easily be stirred. After polymerisation, it may be diluted or cooled without a solvent, and may be hardened to form a solid mass and then ground up.

The products obtained according to the invention are suitable, both as such and in the form of solutions, for use as binders, particularly in the preparation of coating compositions, printing inks and adhesives.

Solvents for the products obtained according to the invention include, for example, aromatic hydrocarbons such as toluene or xylene, and monocarboxylic acid esters such as ethyl acetate, butyl acetate, ethylene glycol monoethyl ether acetate, the corresponding methyl ether acetate or the like.

Copolymers containing at least 5% by weight of component (E) may be wholly or partly neutralised with ammonia and/or amines and dissolved in water.

Copolymers wherein at least some of component (D) is an ester which contains hydroxyalkyl groups, are preferably cross-linked with polyisocyanates at ambient temperature. Isocyanates which may be used for this purpose include aliphatic, cycloaliphatic and aromatic polyisocyanates, such as hexamethylene diisocyanate, isophoron diisocyanate or toluylene-2,4-diisocyanate, and also the other isocyanates listed hereinafter, either individually or in admixture. Curing may be catalysed by the addition of organic tin compounds such as dibutyl-tin dilaurate, dibutyl-tin diacetate, dibutyloxo-tin and, optionally, tertiary amines, preferably diethyl ethanolamine. Blocked polyisocyanates, polycarboxylic acids and/or the anhydrides thereof may also be used for curing at elevated temperature.

Preferably polyisocyanates containing urethane groups and/or biuret groups are used, these polyisocyanates conveniently being formed from 2,4- and 2,6-toluylene diisocyanate, hexamethylene diisocyanate-1,6, diphenylmethane-4,4'-diisocyanate and/or 3-isocyanatomethyl-3,5,5-trimethylcyclohexylisocyanate.

A polyisocyanate containing biuret groups and formed from 3 moles of hexamethylene diisocyanate and 1 mole of water is particularly preferred.

Other cross-linking agents for products according to the invention which contain OH groups are aminoplast resins and/or phenolic resins which harden in the presence of acids, e.g. p-toluenesulphonic acid. Hot curing may be effected in the usual way at temperatures of 120° to 200° C., e.g. over a period of 10 to 30 minutes.

The products containing hydroxyl groups may advantageously be combined with polycarboxylic anhydrides, for the preparation of powder coating compositions. They may also be used for reacting with polycarboxylic anhydrides and the products thus obtained may be further used as hardeners for various synthetic resins, particularly epoxy resins.

It is particularly advantageous to use the products containing hydroxyl groups prepared according to the invention, together with special partial esters of polycarboxylic acids, as described for example in German Patent Application No. P 27 07 018, or together with units of polycarboxylic acids or the anhydrides or ester anhydrides thereof, as described for example in German Patent Applications Nos. P 27 23 492, P 27 54 399.3 and P 25 56 182.4, for curing polyepoxides. Examples of preferred polycarboxylic acid units include polyanhydrides which have been prepared by reacting polycarboxylic anhydrides with at least dihydric alcohols and by at least partial hydrolysis and/or by reacting oligomeric and/or polymeric compounds containing OH groups, these oligomeric and/or polymeric compounds possibly also being condensation products, with polycarboxylic acid compounds, e.g. anhydrides of at least tetrahydric carboxylic acids, with these acid compounds being incorporated in the side chains of the OH compounds, cf. German Patent Application No. P 27 54 399.3. These systems are particularly advantageous for cold curing, owing to their high reactivity.

Copolymers wherein at least some of component (D) is an unsaturated glycidyl ester may be used for cross-linking with amines, but particularly with polycarboxylic acid units, e.g. polycarboxylic acids, polycarboxylic anhydrides and polyesters with a terminal carboxyl group. This applies particularly to curing at elevated temperature.

It is particularly advantageous to use these products containing glycidyl groups in conjunction with the polycarboxylic acid units for the preparation of powdered coating compositions. Curing may optionally be accelerated by the addition of conventional catalysts such as tin octoate, tertiary phosphines, phosphonium salts, tertiary amines, ammonium salts and lithium salts.

According to another embodiment of the invention, a copolymer prepared according to the invention and still containing free COOH groups from component (E) may be cured with triglycidyl isocyanurate. In the following non-limiting examples, % indicates percent by weight and T parts by weight.

EXAMPLES (I) Preparation of the Copolymers

Components (A) and optionally (C) are placed in a reactor fitted with a stirrer, means for introducing inert gas, heating and cooling means and a feed device, and heated to the polymerisation temperature. At this temperature, a mixture of components (B) and (D) and optionally (E) and some initiator is added. Polymerisation is then continued until a reaction of at least 98% is achieved.

The components, the amounts thereof, the reaction conditions and characteristics of the products are shown in the Table which follows.

| Example | Components A (dimethyl maleate) % + C % put in | Components B, D and E % + initiator | Temperature °C. | Polymerisation time h | Characteristics of product |
| --- | --- | --- | --- | --- | --- |
| 1 | 20.8 | 45.0 styrene, 14.7 methyl methacrylate, 19.0 glycidyl methacrylate, 0.5 di-tert.-butyl peroxide | 180 | 6 | Epoxide number 2.1 |
| 2 | 16.0 | 55.0 styrene, 2.4 methyl methacrylate, 25.4 hydroxyethyl methacrylate, 1.0 di-tert.-butyl peroxide | 180 | 6 | OH number 110 |
| 3 | 29.4 | 50.6 styrene, 19 acrylic acid, 1 di-tert.-butyl peroxide | 180 | 6 | Acid number 147 |
| 4 | 13 + 12.25 saturated glycidyl ester | 20 styrene, 26 hydroxyethyl methacrylate, 24.75 methyl methacrylate, 3.6 acrylic acid, 0.5 di-tert.-butyl peroxide | 160 | 9 | OH number 140, acid number 5, viscosity (50% xylene/20° C.) 1400 mPa.s |
| 5 | 15.35 | 45.02 styrene, 24.02 isobornyl methacrylate, 15.11 glycidyl methacrylate, 0.5 di-tert.-butyl-peroxide | 180 | 6 | Epoxide number 1.6 |
| 6 | 15 | 48 styrene, 26 hydroxyethyl methacrylate, 10 acrylamide, 1 di-tert.-butyl peroxide | 190 | 8 | OH number 117, acid number 4, viscosity (50% ethylene glycol monoethyl ether acetate) 2100 mPa.s |

II. Preparation of Coating Compositions

From the solid resins prepared according to Examples 2, 4 and 6, 60% solutions were prepared in a solvent mixture consisting of 2 T of xylene and 1 T of ethylene glycol monoethyl ether acetate. Coating compositions were prepared with these solutions, with the following formulations; the numbers indicate parts by weight.

| Example | 2 | 4 | 6 |
| --- | --- | --- | --- |
| Polymer solution | 167 | 167 | 167 |
| Titanium dioxide | 106.20 | 115.9 | 110.6 |
| Dibutyl tin dilaurate (1% in xylene) | 0.55 | 0.55 | 0.55 |
| Diethylethanolamine | 0.90 | 0.90 | 0.90 |
| Silicone oil (1% in xylene) | 2.30 | 2.30 | 2.30 |
| Reaction product of hexamethylene diisocyanate and water (75% in ethyleneglycol monoethyl ether acetate) | 43.60 | 59.80 | 51.00 |

III. Technical Tests on the Coating Compositions

The coating compositions were adjusted to a viscosity of 50 s (DIN 53 211/20° C.) with a solvent mixture consisting of xylene, a mixture of aromatic hydrocarbons (boiling point within the range 165° to 175° C.), butyl acetate and ethylene glycol monoethyl ether acetate (weight ratio 40:25:20:15) and were then applied, in a wet layer thickness of 100 μm, to glass plates and steel sheets.

To determine the time required for the film to become bone dry, reflective beads with a diameter of from 0.1 to 0.4 mm were applied to the film of coating composition over a width of 5 mm by means of a pipette. The glass plate coated with the coating composition was then placed at an angle and tapped. When all the beads fell off the film was bone dry.

The results of the technical tests on the coating compositions are shown in the following Table. In this Table, (a) represents hardening at ambient temperature and (b) represents hardening at 80° C. for 30 minutes. The resistance to xylene, the Erichsen cupping and the gloss were measured after 10 days.

| Example | 2 | | 4 | | 6 | |
|---|---|---|---|---|---|---|
| Hardening | a | b | a | b | a | b |
| Bone dry (min.) | 12 | | 11 | | 29 | |
| Pendulum hardness according to Konig (DIN 53 157) after | | | | | | |
| 2 hours | 10 | | 9 | | 27 | |
| 4 hours | 14 | | 12 | | 47 | |
| 6 hours | 16 | | 17 | | 67 | |
| 24 hours | 61 | 176 | 58 | 154 | 140 | 184 |
| Resistance to xylene (min.) | 30 | 30 | 30 | 30 | 30 | 30 |
| Erichsen cupping (mm.) (DIN 53 156) | 9.4 | 9.5 | 9.3 | 8.6 | 8.2 | 7.3 |
| Gloss according to Lange 60° angle | 128 | 128 | 116 | 116 | 118 | 120 |

IV. Discussion of the Results

As can be seen from the preceding Table, the films dry very rapidly and have good mechanical properties and good resistance to chemicals, particularly xylene.

What we claim is:

1. A process for preparing copolymers which comprises copolymerizing in a radical bulk polymerization the following components:
   (A) between 10 and 60 parts by weight of at least one diester of an α,β-olefinically unsaturated dicarboxylic acid with a monohydric alcohol having 1 to 8 carbon atoms in each ester group,
   (B) between 10 and 70 parts by weight of at least one vinyl derivative of a monocyclic aromatic hydrocarbon having but one vinyl group, in which any alkyl groups optionally in α-position or attached to the aromatic ring system have from 1 to 3 carbon atoms;
   (C) between 0 and 30 parts by weight of at least one glycidyl ester of an aliphatic saturated monocarboxylic acid being branched in α-position, the acid having from 9 to 11 carbon atoms,
   (D) between 0 and less than 51 parts by weight of at least one ester or amide of at least one α,β-olefinically unsaturated monocarboxylic acid or an anhydride of at least one α,β-olefinically unsaturated dicarboxylic acid,
   (E) between 0 and 40 parts by weight of at least one α,β-olefinically unsaturated monocarboxylic acid, wherein at least one of Components (D) and (E) is present, the total amount of Components (A) to (E) is 100 parts by weight, the polymerization is effected by introducing at first at least one part of Component A into the reaction vessel alone or in combination with at least a part of Component (C), heating the contents of the vessel to a temperature in the range between 140° and 200° C. and then copolymerizing by gradually adding a mixture of Component (B) with at least one of Components (D) and (E) or a combination of said mixture with remaining parts, if any, of Component A or of Components (C) and (A) or a combination of said mixture with the whole part of Component (C) into said vessel together with a radical initiator alone or in combination with a molecular weight regulator and wherein, if Component (C) is present, an at least equimolar amount, referred to Component (C), of Component (E) is added.

2. A process as claimed in claim 1 wherein component (A) is reacted in the form of a dialkylester of maleic or fumaric acid or of both, said ester having between 1 and 8 carbon atoms in each ester group.

3. A process as claimed in claim 1 wherein the initiator is present in a total amount between 0.5 and 2.5 percent by weight, referred to the total weight of the starting components.

4. A process as claimed in claim 1 wherein Component (D) is reacted in the form of at least one compound selected from the group consisting of an acrylic or methacrylic ester of a monohydric alcohol having between 1 and 12 carbon atoms, an acrylic or methacrylic ester of a polyhydric alcohol having between 2 and 10 carbon atoms, a glycidyl acrylate, a glycidyl methacrylate and an addition product of an α,β-olefinically unsaturated carboxylic acid with a monoglycidyl ester or monoglycidyl ether or both.

5. A process as claimed in claim 1 wherein a copolymer is prepared by copolymerizing an amount of at least 5% by weight of Component (E) which is then at least partially neutralized with at least one nitrogen compound selected from the group consisting of ammonia and amine.

6. A process as claimed in claim 1 wherein a Component (D) is used which contains hydroxy groups.

7. A process as claimed in claim 6 wherein the hydroxy groups are derived from the use of a Component (D) containing hydroxy alkyl groups or unsaturated glycidyl esters.

8. A process as claimed in claim 1 wherein a Component (C) or (D) is used which contains glycidyl groups.

9. A process for preparing copolymers which comprises copolymerizing in a radical bulk polymerization the following components:
   (A) between 10 and 30 parts by weight of at least one diester of an α,β-olefinically unsaturated dicarboxylic acid with a monohydric alcohol having 1 to 8 carbon atoms in each ester group,
   (B) between 35 and 60 parts by weight of at least one vinyl derivatives of a monocyclic aromatic hydrocarbon having but one vinyl group, in which any alkyl groups optionally in α-position or attached to the aromatic ring system having from 1 to 3 carbon atoms, (C) between 0 and 30 parts by weight of at least one glycidyl ester of an aliphatic saturated monocarboxylic acid being branched in α-postiion, the acid having from 9 to 11 carbon atoms, (D) between 0 and less than 51 parts by weight of at least one ester or amide of at least one α,β-olefinically unsaturated monocarboxylic acid or an anhydride of at least one α,β-olefinically unsaturated dicarboxylic acid, (E) between 0 and 40 parts by weight of at least one α,β-olefinically unsaturated monocarboxylic acid wherein at least one of Components (D) and (E) is present, the total amount of Components (A) to (E) is 100 parts by weight, the copolymerization is effected by first introducing at least one part of Component (A) into the reaction vessel alone or in combination with at least a part of Component (C), heating the contents of the vessel to a temperature in the range between 140° and 200° C. and then copolymerizing by gradually adding a mixture of Component (B) with at least one of Components (D) and (E) or a combination of said mixture with remaining parts if any, of Component (A) or Components (A) and (C) or a combination of said mixture with the whole part of Component (C) into said vessel together with a radical initiator alone or in combination with a molecular weight regulator and wherein, if Component (C) is present, an at least equimolar amount, referred to Component (C), of Component (E) is added.

10. A process for preparing copolymers which comprises copolymerization in a radical bulk polymerization the following components consisting essentially of:

(A) between 10 and 60 parts by weight of at least one diester of an α,β-olefinically unsaturated dicarboxylic acid with a monohydric alcohol having 1 to 8 carbon atoms in each ester group, (B) between 10 and 70 parts by weight of at least one vinyl-derivative of a monocyclic aromatic hydrocarbon having but one vinyl group, in which any alkyl groups optionally in α-position or attached to the aromatic ring system have from 1 to 3 carbon atoms, (C) between 0 and 30 parts by weight of at least one glycidyl ester of an aliphatic saturated monocarboxylic acid being branched in α-position, the acid having from 9 to 11 carbon atoms, (D) between 0 and less than 51 parts by weight of at least one ester or amide of at least one, -olefinically unsaturated monocarboxylic acid or an anhydride of at least one, -olefinically unsaturated dicarboxylic acid, (E) between 0 and 40 parts by weight of at least one, -olefinically unsaturated monocarboxylic acid, wherein at least one of Components (D) and (E) is present, the total amount of Components (A) to (E) is 100 parts by weight and Component (A) is at first introduced into the reaction vessel alone or in combination with at least a part of Component (C), heating the contents of the vessel to a temperature in the range between 140° and 200° C. and then copolymerizing by gradually adding a mixture of Component (B) with at least one of Components (D) and (E) or a combination of said mixture with remaining parts of Components (C) in the portions referred to above into said vessel together with a radial initiator alone or in combination with a molecular weight regulator and wherein, if Component (C) is present, an at least equimolar amount, referred to Component (C), of Component (E) is added.

11. A process as claimed in claim 1 wherein the amount of component (B), referred to the sum of components (B), (D) and (E), is up to 73.1 percent by weight.

12. A process as claimed in claim 1, wherein the component (C) is used in an amount of from 5 to 15 parts by weight.

13. A process as claimed in claim 1, wherein the reaction is carried out without using a molecular weight regulator.

* * * * *